Dec. 25, 1934.   B. N. WALLIS   1,985,649
CONSTRUCTION OF WINGS FOR AIRCRAFT
Filed Dec. 12, 1933   4 Sheets-Sheet 1

Dec. 25, 1934.  B. N. WALLIS  1,985,649
CONSTRUCTION OF WINGS FOR AIRCRAFT
Filed Dec. 12, 1933  4 Sheets-Sheet 2
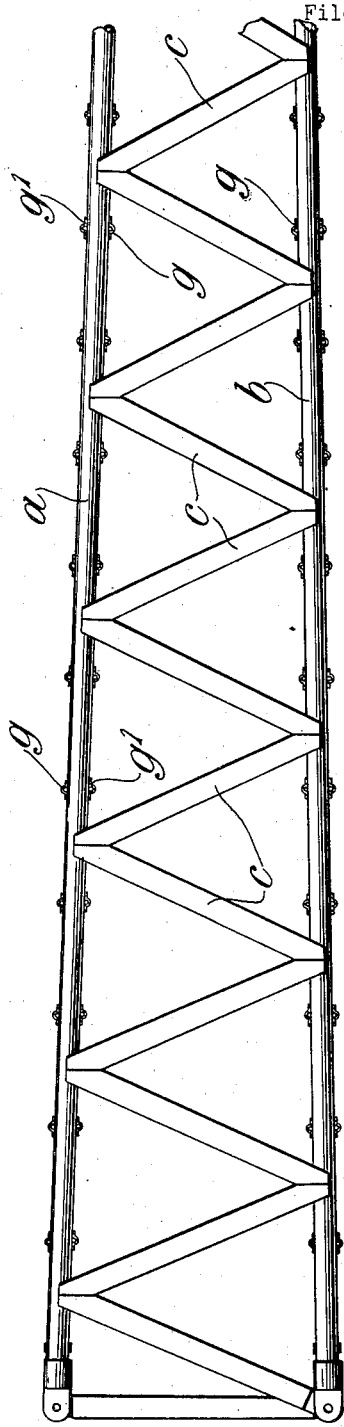
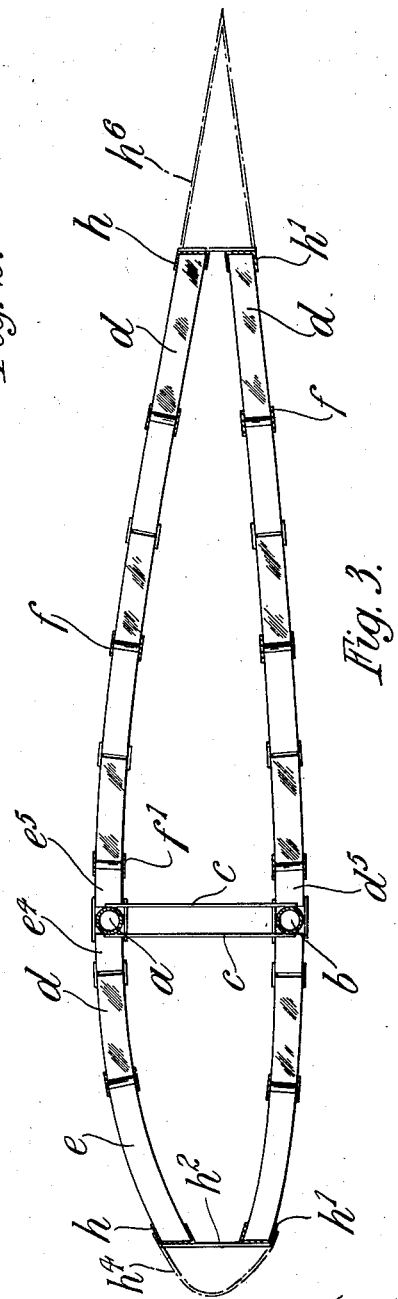
Fig. 2.
Fig. 3.
Barnes Neville Wallis
Inventor
By Wm. R. Lamb Atty Dec. 25, 1934. B. N. WALLIS 1,985,649
CONSTRUCTION OF WINGS FOR AIRCRAFT
Filed Dec. 12, 1933 4 Sheets-Sheet 4

Patented Dec. 25, 1934

1,985,649

UNITED STATES PATENT OFFICE 1,985,649

CONSTRUCTION OF WINGS FOR AIRCRAFT

Barnes Neville Wallis, Weybridge, England, assignor to Vickers (Aviation) Limited, Weybridge, England Application December 12, 1933, Serial No. 702,064
In Great Britain December 22, 1932

12 Claims. (Cl. 244—31)

This invention relates to the construction of wings for aircraft and aims at securing wings of great rigidity and torsional stiffness. This effect is attained by supporting an exterior fabric or other thin flexible cover on an exterior contour frame in which the metal comprising the torsion and shear resisting bracing members and the longitudinal members is located near the surface of the wings in the position of optimum value.

According to this invention an upper boom and a lower boom located at or near (hereinafter referred to as "in" for brevity) the deepest portion of the wing, together with or without a boom located in or adjacent to the leading edge of the wing, and a member or boom in or adjacent to the trailing edge, are held in position by bracing members having greater depth normal to the contour than breadth and arranged in two series which cross each other, said bracing members being formed with their neutral axes as geodesics, or approximately as geodesics, in a surface equidistant at all points from the external surface of the wing. The axes of these geodetic bracing members intersect each other at all points of crossing and also intersect the booms and the trailing edge member and leading edge member where they cross or converge. The upper and lower booms may be braced or connected to each other by webs or other direct interconnections which combine with the booms to produce girders capable of resisting vertical forces and which are maintained rigid against torsional and horizontal forces by the geodetic bracing members. The bracing members are preferably symmetrical with respect to axes passing through the points of intersection of said bracing members, parallel to the booms.

In a modification, the webs or other direct interconnections between the upper and lower booms are eliminated. The vertical shear forces are then taken by the booms themselves assisted by the geodetic bracing members. In such a construction it is necessary to increase the strength of the booms and/or of the geodetic bracing members, because the advantage of direct connection between the booms is absent.

A practical example of wing construction according to the invention will now be described with reference to the accompanying drawings in which:—

Figure 2 is a section on the line 2—2 in Figure 1 drawn to an enlarged scale.

Figure 3 is a section on the line 3—3 in Figure 1 drawn to an enlarged scale.

Figure 1:
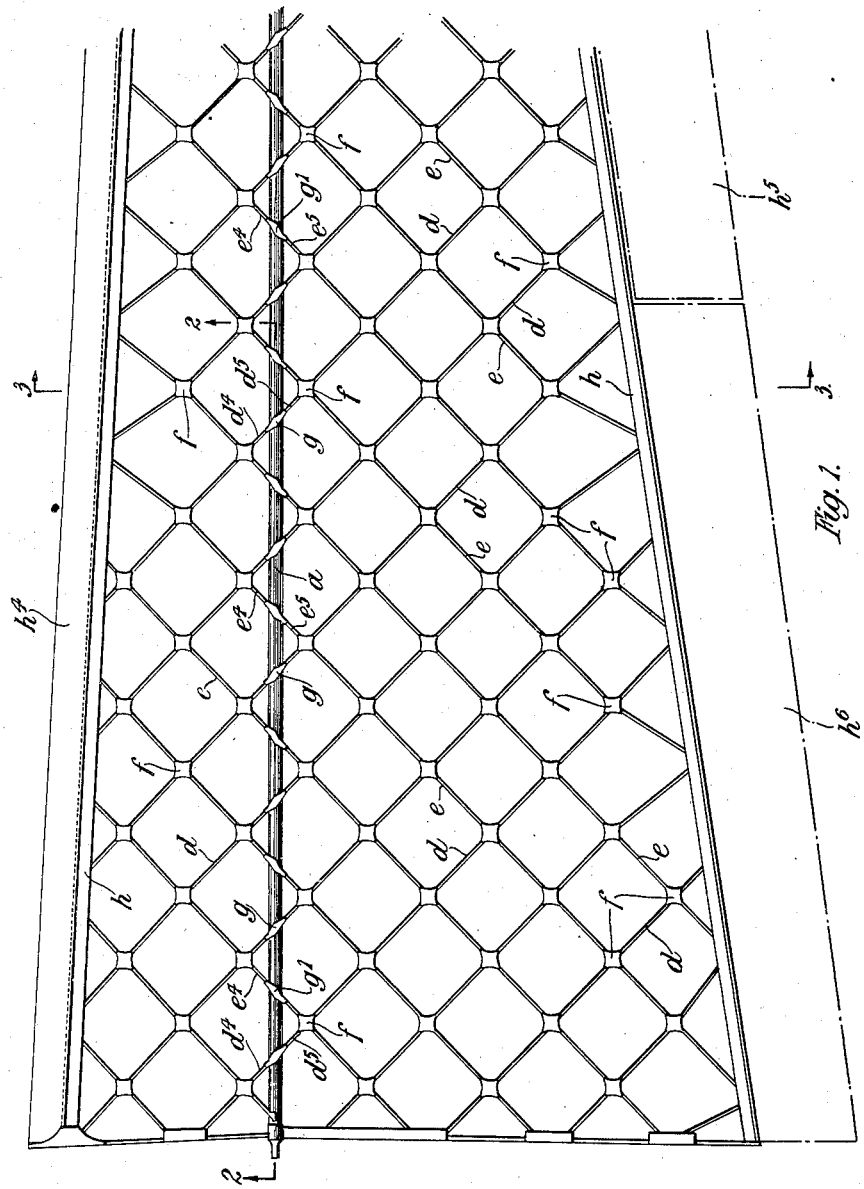
Figure 1 is a plan view of part of a wing showing one of the booms, the bracing members and the leading and trailing edge members, but omitting the fabric covering.

In Figures 1 to 3 the upper boom $a$ and the lower boom $b$ are interconnected, and braced against vertical shear forces by the Warren system diagonals $c$, and braced against torsional and horizontal shear forces in the wing structure by the two series of bracing members arranged crosswise, the bracing members marked $d$ of one series extending in one direction while the bracing members marked $e$ of the other series extend in the other direction. These crosswise bracing members intersect and are made in sections extending from one point of intersection to the next. Said bracing members are constructed of channel section material having their webs $d^1$, $e^1$ extending inwardly normal to the contour, and having their flanges $d^2$, $d^3$; $e^2$, $e^3$ extending in the direction of span of the wing. The intersecting fitting for rigidly fixing the bracing members together where they intersect comprises two gusset plates $f$, $f^1$, and a connecting piece $f^2$ to which extension lugs $d^6$, $e^6$ of the webs $d^1$, $e^1$ and the flanges $d^2$, $d^3$; $e^2$, $e^3$ are attached by rivets.

Figure 6:
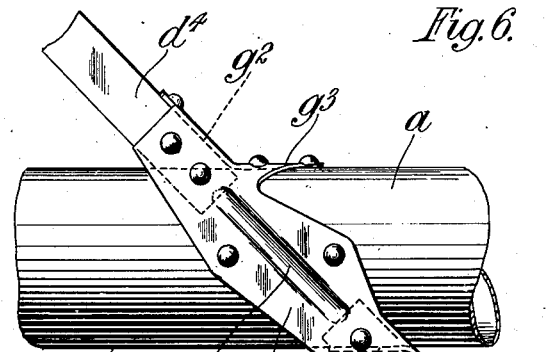
Figures 6 and 7 show in plan and elevation respectively, the means for fixing the bracing members to the booms.
Figure 7:
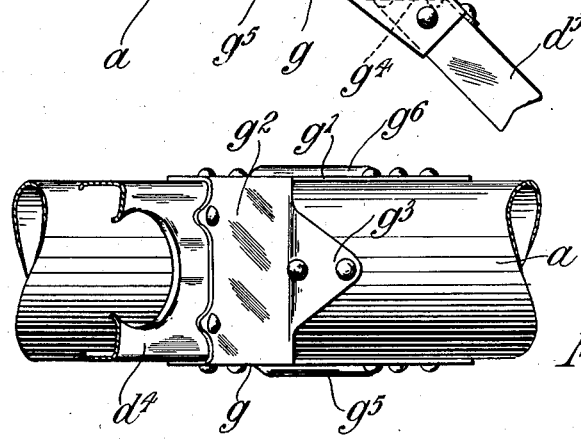
Figure 9:
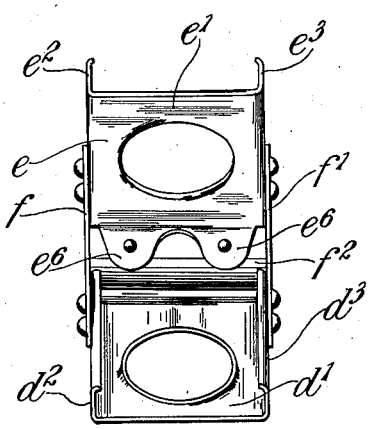
Figures 8 and 9 show in plan and end elevation respectively, a fitting for connecting the bracing members where they intersect.
Figure 8:
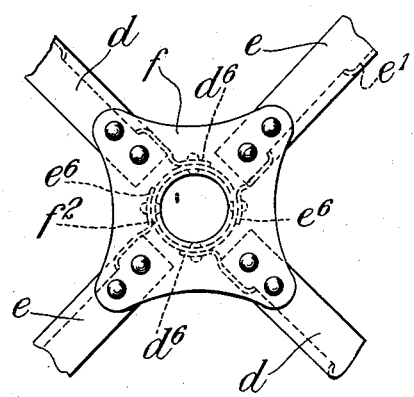

The bracing members which intersect the boom are made in shorter sections than the remainder, these short sections being marked $d^4$, $d^5$; $e^4$, $e^5$, respectively. One end of each short section is fixed like the other sections to an intersecting fitting $f$, the other ends being rigidly secured together in pairs and to the booms by boom fittings each of which, as shown in Figures 6 and 7, consists of two opposed side plates $g$, $g^1$, with a web $g^2$, the web being formed with an elliptical hole so that it can be passed over the boom and fixed to this by opposed lugs, one of which $g^3$ extends outwardly and the other of which $g^4$ extends inwardly relatively to the fitting. To stiffen the side plates and enable them to transmit the stresses from one section to the continuing section, pressed out fillets $g^5$, $g^6$ are formed in said plates. The side plates $g$, $g^1$, and lugs $g^3$, $g^4$ are riveted to the boom and the side plates $g$, $g^1$ and web $g^2$ of the boom fitting are riveted to the flanges and web of the sections $d^4$, $d^5$.

It will be understood that two of these opposed series of bracing members are provided, one at the upper surface, and the other at the lower surface of the wing, these bracing members being superposed.

Figure 4:
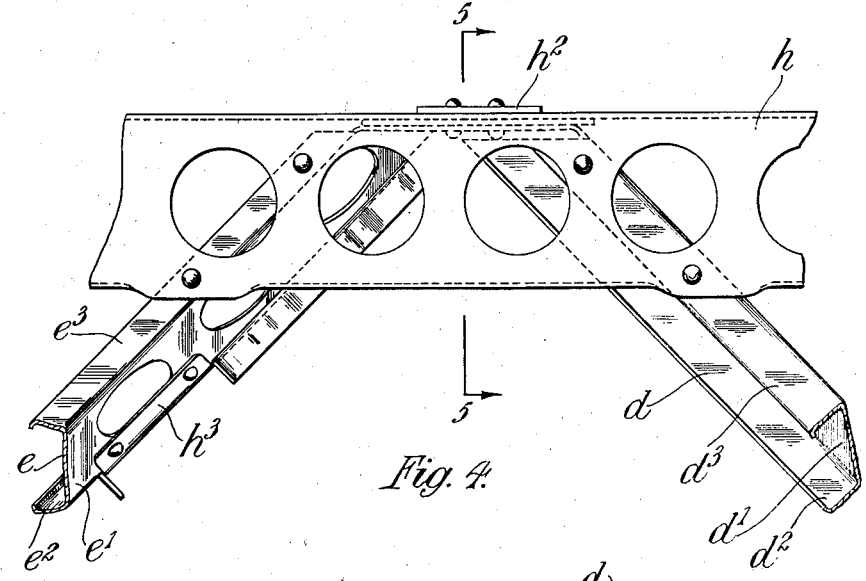
Figure 4 is a fragmentary plan view on an enlarged scale showing the joint between the bracing members and the leading edge member.
Figure 5:
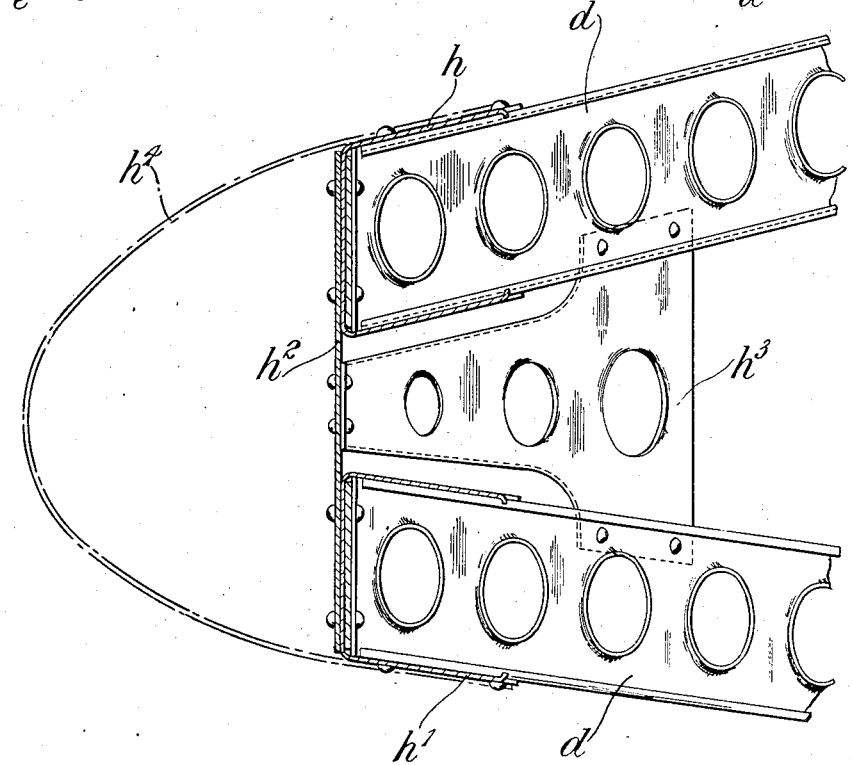
Figure 5 is a section on the line 5—5 in Figure 4.

For convenience of construction, the bracing members are not carried right up to their points of intersection at the leading and trailing edges but, as shown, terminate adjacent to the said edges. The terminations of the bracing members are fixed together by leading and trailing edge booms of similar construction, so that the leading edge boom will now be described by way of example, with particular reference to Figures 4 and 5. The bracing members $d$ and $e$ of the upper surface of the wing are received in a channel member $h$ extending in the direction of span of the wing, while the bracing members $d$ and $e$ of the lower surface of the wing are received in a similar channel member $h^1$. The flanges of these channel members are arranged to extend along the ends of the flanges of the bracing members to which they are riveted and the webs of the channel members which are vertical are riveted to extensions formed in the webs of the bracing members. The webs of these channel members are interconnected by bracing diagonals arranged on the Warren system, and are also provided, where the bracing members meet on said channel members, with a vertical plate $h^2$ to which are fixed triangular knee pieces $h^3$ which extend in the direction of each superposed pair of bracing members, these knee pieces are also fixed, at points spaced from the vertical plates, to the webs of each superposed pair of bracing members; thus forming a three point triangular connection for each knee piece. At the leading edge a fairing of suitable shape, indicated by $h^4$, is provided. The construction of the trailing edge boom being similar to that of the leading edge boom will be understood from the foregoing description, the only difference being that an aileron $h^5$ is hinged to the trailing edge boom at the outer part of the wing, while the space between the aileron and the root of the wing is occupied by a fairing piece of suitable section indicated at $h^6$.

It will be observed that, owing to the taper of the wing, the arrangement of the bracing members has to be slightly modified at the leading and trailing edges.

Outside the bracing members of the structure thus formed, stringers may be attached either in the direction of the span of the wing or transversely thereto, and around the wing structure a fabric covering is applied and secured in any convenient manner.

The construction thus obtained results, as before stated, in a wing which may be regarded as an analytical structure of which the bracing members are bowed out so as to conform to the contour of the wing. The geodetic bracing members not only act as torsion and horizontal shear bracings, but also serve as formers for carrying the outer covering, and thus eliminate the usual transverse ribs and the drag and anti-drag bracings while the material forming the geodetic bracing members is utilized to the highest degree of efficiency, resulting in a wing of extreme lightness and great strength and rigidity.

The structure before described results in a contoured wing frame in which geodetic bracing members resist all torsional loads imposed on the wing in the manner of a stressed skin but without the weight necessarily incorporated in such a stressed skin for the purpose of resisting the crinkling of the skin likely to be set up in withstanding torsional or flexural stresses. The effect therefore is secured of a skin of great thickness but yet of minimum weight which not only resists torsional loads but contributes to the strength of the wing in other directions, thus enabling a wing of great strength and stiffness to be secured for the minimum expenditure of weight.

In the modification referred to above, the construction is the same except that the Warren system diagonals $c$ between the boom are eliminated forming a wing having an interior completely free and unobstructed. In this modification where the outer end of a wing is left open and not reduced in depth to a fine outer edge closing the wing, an inner wing of any suitable construction may be provided to slide telescopically in the outer wing, for example by being guided on suitable runners, said inner wing being adapted to be projected outwardly from the outer wing for the purpose of increasing the wing area when taking off or landing, when a slower flying speed is desirable under a lighter wing loading. One such extension may be provided in each wing, or multiple extensions which could be slidden outwards either simultaneously to increase the span equally for each section, or successively as desired. In such a construction, the wing depth and chord of the entire inner wing might remain constant while the outer and larger wing which is not adjustable but is permanently fixed to the fuselage may be tapered from its root to its tip.

It will be understood that the inner wing may be built up with longitudinal booms (with or without a web or other interconnecting members) and intersecting geodetic bracing members similar to that of the outer wing.

The invention is particularly applicable to a cantilever wing but is also applicable to superposed wings which are stayed apart by interplane struts, with or without lift and anti-lift bracings, in order to take lifting loads and assist in resisting torsion stresses.

What I claim as my invention and desire to secure by Letters Patent is:—

1. An aircraft wing structure having at each upper and lower surface two series of bracing members shaped to correspond with the contour of the wing having a greater depth than breadth and having their depth normal to the contour at all points, said bracing members being formed with their neutral axes in geodetic lines and being so arranged that the bracing members in one series intersect the bracing members in the other; means for securing the bracing members to each other where they intersect, booms intersecting said bracing members, and means for securing the bracing members to said booms.

2. An aircraft wing structure having at each upper and lower surface two series of symmetrical bracing members shaped to correspond with the contour of the wing having a greater depth than breadth and having their depth normal to the contour at all points, said bracing members being formed with their neutral axes in geodetic lines and being so arranged that the bracing members in one series intersect the bracing members in the other; means for securing the bracing members to each other where they intersect, booms intersecting said bracing members, and means for securing the bracing members to said booms.

3. An aircraft wing structure having at each upper and lower surface two series of bracing members shaped to correspond with the contour of the wing having a greater depth than breadth and having their depth normal to the contour at all points, said bracing members being formed with their neutral axes in geodetic lines and being so arranged that the bracing members in one series intersect the bracing members in the other; means for securing the bracing members to each other where they intersect, upper and lower booms intersecting said bracing members, means directly interconnecting said upper and lower booms, and means for securing the bracing members to said booms.

4. An aircraft wing structure having at each upper and lower surface two series of bracing members shaped to correspond with the contour of the wing having a greater depth than breadth and having their depth normal to the contour at all points, said bracing members being so arranged that the bracing members in one series intersect the bracing members in the other, with the bracing members in each series constructed in sections extending from one point of intersection to the next and having their neutral axes in geodetic lines; means for securing the sections in each series one to another and to the sections of the other series where they intersect, booms intersecting said sections, and means for securing the sections to the booms.

5. An aircraft wing structure having at each upper and lower surface two series of bracing members shaped to correspond with the contour of the wing having a greater depth than breadth and having their depth normal to the contour at all points, said bracing members being so arranged that the bracing members in one series intersect the bracing members in the other, with the bracing members in each series constructed in sections extending from one point of intersection to the next and having their neutral axes in geodetic lines; intersecting fittings for securing the sections in each series one to another and to the sections of the other series where they intersect, upper and lower booms intersecting said sections, means directly interconnecting said upper and lower booms, and boom fittings for securing the sections to the booms.

6. An aircraft wing structure having at each upper and lower surface two series of channel-section bracing members shaped to correspond with the contour of the wing having webs of a greater depth than the breadth of the flanges and having the webs normal to the contour at all points, said bracing members being so arranged that the bracing members in one series intersect the bracing members in the other, with the bracing members in each series constructed in sections extending from one point of intersection to the next and having their neutral axes in geodetic lines; means for securing the sections in each series one to another and to the sections of the other series where they intersect, upper and lower booms intersecting said sections, means directly interconnecting said upper and lower booms, and means for securing the sections to said booms.

7. An aircraft wing structure having at each upper and lower surface two series of channel-section bracing members shaped to correspond with the contour of the wing having webs of a greater depth than the breadth of their flanges and having the webs normal to the contour at all points, said bracing members being so arranged that the bracing members in one series intersect the bracing members in the other, with the bracing members in each series constructed in sections extending from one point of intersection to the next and having their neutral axes in geodetic lines; intersecting fittings for securing the sections in each series one to another and to the sections of the other series where they intersect, booms intersecting said sections, and boom fittings for securing the sections to said booms, said sections having their webs and flanges fitting against and attached to the intersecting fittings and the boom fittings.

8. An aircraft wing structure having at each upper and lower surface two series of bracing members shaped to correspond with the contour of the wing having a greater depth than breadth, and having their depth normal to the contour at all points, said bracing members being so arranged that the bracing members in one series intersect the bracing members in the other, with the bracing members in each series constructed in sections extending from one point of intersection to the next and having their neutral axes in geodetic lines; intersecting fittings for securing the sections in each series one to another and to the sections of the other series where they intersect, upper and lower booms intersecting said sections, means directly interconnecting said upper and lower booms, and boom fittings on each boom, each consisting of two side plates and a web having an elliptical hole therein for the boom, said boom fittings being fixed to the boom and to the sections intersecting the boom.

9. An aircraft wing structure having at each upper and lower surface two series of bracing members shaped to correspond with the contour of the wing having a greater depth than breadth and having their depth normal to the contour at all points, said bracing members being so arranged that the bracing members in one series intersect the bracing members in the other, with the bracing members in each series constructed in sections extending from one point of intersection to the next and having their neutral axes in geodetic lines; intersecting fittings for securing the sections in each series one to another and to the sections of the other series where they intersect, booms intersecting said sections, and boom fittings on each boom, each consisting of two side plates having pressed out fillets therein and a web having an elliptical hole therein for the boom, said boom fittings being fixed to the boom and to the sections intersecting the boom.

10. An aircraft wing structure comprising in combination upper and lower booms in the deepest portion of the wing; a leading edge boom; a trailing edge boom, said booms all extending in the direction of span; means directly interconnecting said upper and lower booms; two series of bracing members at each upper and lower surface of the wing shaped to correspond with the contour of the wing having a greater depth than breadth and having their depth normal to the contour at all points, said bracing members being arranged in two series which intersect each other and intersect the booms, with the bracing members in each series constructed in sections extending from one point of intersection to the next and having their neutral axes in geodetic lines; means for securing the sections in each series one to another and to the sections of the other series where they intersect; and means for securing the sections to the booms.

11. An aircraft wing structure comprising in combination upper and lower booms extending in the direction of span in the deepest portion of the wing; a leading edge boom extending in the direction of span adjacent to but spaced apart from a leading edge of the wing; a trailing edge boom extending in the direction of span adjacent to but spaced apart from a trailing edge of the wing; two series of bracing members at each upper and lower surface of the wing shaped to correspond with the contour of the wing having a greater depth than breadth and having their depth normal to the contour at all points, said bracing members being formed with their neutral axes in geodetic lines and being arranged in two series which intersect each other and intersect the booms; means for securing the bracing members to each other where they intersect; means for securing the bracing members to the booms; and fairings fixed to the leading and trailing edge booms adapted to form the leading and trailing edges.

12. An aircraft wing structure comprising in combination upper and lower booms extending in the direction of span in the the deepest portion of the wing; a leading edge boom extending in the direction of span adjacent to but spaced apart from a leading edge of the wing; a trailing edge boom extending in the direction of span adjacent to but spaced apart from a trailing edge of the wing; upper and lower sets of bracing members, the upper set shaped to correspond with the upper contour of the wing, and the lower set with the lower contour of the wing between said booms, having a greater depth than breadth and having their depth normal to the contour at all points, said bracing members being formed with their neutral axes in geodetic lines and being arranged in two series which intersect each other and intersect the booms; means for securing the bracing members to each other where they intersect; means for securing the bracing members to the booms with which they intersect; channels constituting parts of said leading and trailing edge booms for receiving and securing the bracing members which intersect these booms; knee pieces for connecting upper and lower bracing members to each other and to leading and trailing edge booms at their points of connection; and fairings fixed to the leading and trailing edge booms adapted to form the leading and trailing edges.

BARNES NEVILLE WALLIS.